United States Patent [19]

Niino

[11] 4,412,266
[45] Oct. 25, 1983

[54] AC ELECTRICAL DEVICE PROTECTIVE THERMAL RELAY

[75] Inventor: Masahiko Niino, Nagoya, Japan

[73] Assignee: Yamada Electric Manufacturing Company Ltd., Nagoya, Japan

[21] Appl. No.: 400,448

[22] Filed: Jul. 21, 1982

Related U.S. Application Data

[63] Continuation of Ser. No. 215,810, Dec. 12, 1980, abandoned.

[30] Foreign Application Priority Data

Jul. 2, 1980 [JP] Japan .................. 55-90359
Jul. 7, 1980 [JP] Japan .................. 55-92869

[51] Int. Cl.³ ............... H02H 7/085; H02H 7/097
[52] U.S. Cl. ........................ 361/24; 361/32;
361/106; 361/76; 361/77; 318/783
[58] Field of Search ............ 361/76, 92, 77, 106,
361/105, 24, 25, 26, 27, 31, 32, 28, 29, 23;
318/782, 783, 785, 788; 337/100, 102, 107;
338/22 SD, 13, 22 D

[56] References Cited

U.S. PATENT DOCUMENTS

| | | | |
|---|---|---|---|
| 2,324,161 | 7/1943 | Holmes | 361/26 |
| 2,463,935 | 3/1949 | Fish et al. | 361/105 X |
| 2,768,342 | 10/1956 | Vaughan et al. | 361/24 X |
| 2,774,929 | 12/1956 | Schaefer | 361/105 X |
| 3,110,844 | 11/1963 | Brandt, Jr. | 361/76 |
| 3,188,522 | 6/1965 | Culbertson | 361/77 |
| 3,482,146 | 12/1969 | McMorrow et al. | 361/105 X |
| 3,840,834 | 10/1974 | Obenhaus et al. | 361/105 X |
| 4,042,860 | 8/1977 | Woods et al. | 361/25 |

FOREIGN PATENT DOCUMENTS 675518 7/1979 U.S.S.R. ............... 361/24

*Primary Examiner*—Patrick R. Salce
*Attorney, Agent, or Firm*—Carroll F. Palmer

[57] ABSTRACT

A protective thermal relay comprises a main heater for heating a snap-action element of a bimetallic switch to open the switch. The main heater is connected in series with the motor or other device to be protected by the relay. There is also an auxiliary heater for the bimetal element that is energized through an abnormal condition detection relay, e.g., a negative phase sequence detector, when the abnormal condition occurs. The auxiliary heater is a positive temperature coefficient type and will heat and hold the switch in the motor off mode as long as the negative phase sequence or other abnormal situation remains.

2 Claims, 14 Drawing Figures

AC ELECTRICAL DEVICE PROTECTIVE THERMAL RELAY

This is a continuation, of application Ser. No. 215,810, filed Dec. 12, 1980; now abandoned.

BACKGROUND OF THE INVENTION

This invention relates to ac electrical protective thermal relay devices responsive to overload current or heat generation in a motor or other electrical unit requiring protection therefrom and which is also responsive to actuation by a detection device that senses some other abnormal condition that must be protected against.

In general, thermal relays comprise a heater through which loaded current flows and a bimetallic switch to be heated by said heater. Conventionally, the thermal relay is housed in the device to be protected as, for example, a motor so it may be effective in protecting the device against overcurrent when overloaded.

The desire to stop the motor may arise not only from the motor's overcurrent flow or its generated-heat but from water level reduction for an underwater pump or shortage of refrigerant in air conditioning equipment. For those cases, shutting off the motor's power by means of the thermal relay instead of other kinds of switch element would result in substantial advantage.

SUMMARY OF THE INVENTION

A thermal relay with respect to this invention comprises a bimetal element of a bimetallic switch initiated by generated heat of a device to be protected, a main heater which independently produces enough amount of heat required to snap the bimetal element, and an auxiliary heater. When more than a certain amount of loaded current of a device to be protected is allowed to flow through the main heater, the bimetallic switch snaps to open the loaded current circuit so as to protect said device to be protected. Also actuating current other than the loaded current of the device to be protected can be adapted to flow through the auxiliary heater and actuate the switch.

According to the thermal relay of this invention, for an emergency unfavorable enough to keep energizing the device to be protected, the thermal relay is adapted to permit the actuating current to flow through the auxiliary heater by action of a detective device. This so energizes said auxiliary heater as to actuate the bimetallic switch to open the current circuit of the device to be protected.

An object of this invention is to provide a thermal relay with an auxiliary heater of a positive temperature coefficient type which supplies the required amount of heat to the bimetallic switch to snap it open regardless of voltage variation, and which at the same time, prevents temperature of the auxiliary heater from rising more than necessary to protect surrounding insulations against deterioration. A still further object of this invention is to provide a thermal relay which reduces the number of parts to make the relay compact.

DETAILED DESCRIPTION OF THE INVENTION

This invention may be best understood by reference to the following description of one embodiment taken in conjunction with the accompanying drawings from FIG. 1 to FIG. 10. This embodiment provides one example for protecting a motor against an overload, open-phase or generated-heat of a three phase ac power source and also against negative phase sequence of the three-phase ac power source in response to instruction from a negative phase sequence detective relay.

Figure 1:
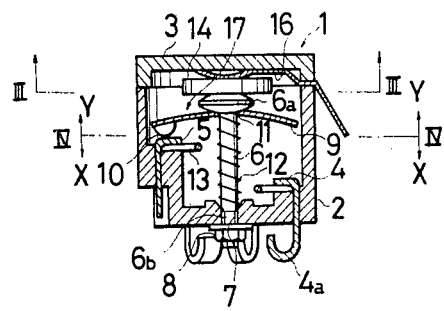
FIG. 1 is a lateral cross sectional view of a thermal relay according to an embodiment of this invention.
Figure 2:
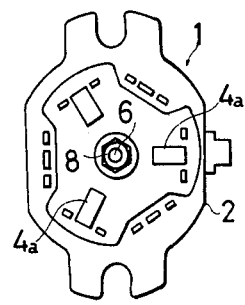
FIG. 2 is a bottom view of the thermal relay of FIG. 1.
Figure 3:
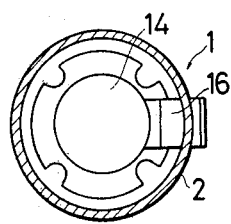
FIG. 3 is a cross sectional view taken substantially along line III—III of FIG. 1.
Figure 4:
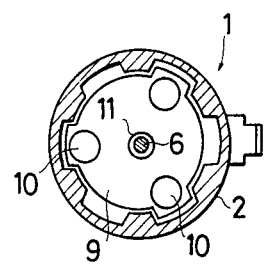
FIG. 4 is a cross sectional view taken substantially along line IV—IV of FIG. 1 viewed from the arrowed line Y.
Figure 5:
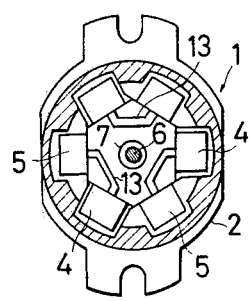
FIG. 5 is a cross sectional view taken substantially along line IV—IV of FIG. 1 viewed from the arrowed line X.
Figure 6:
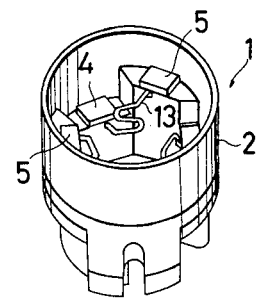
FIG. 6 is a perspective view of a thermal relay shown in FIG. 1 with a cover removed.
Figure 7:
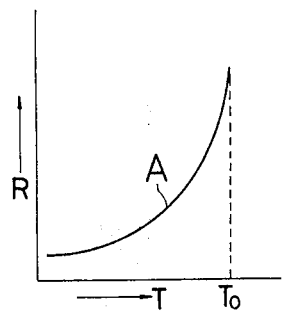
FIG. 7 is a thermal characteristic diagram of a heater having positive temperature coefficient which is to be employed in one embodiment.

A thermal relay 1 comprises an upper face-opened case 2 and a cover 3 to close the upper face-opened portion of the case 2. Three terminates 4 are disposed in the case 2, connecting tongues 4a which integrally extend outwardly from the terminals 4 outside of the case 2. Each of three fixed contacts 5 is arranged between abutting terminals 4 positioned at a higher level than the terminals 4. A metallic supporting bar 6 having both a contact terminal 6a of larger diameter in the upper end and a threaded portion 6b in the lower end is screwed to a threaded bore 7 formed at a bottom wall of the case 2 by a nut 8 to be supported upright within the case 2. A disc-shaped bimetal element 9 has three traveling contacts 10 in the proximity of its peripheral end and a hole 11 at its central portion. Said supporting bar 6 extends through the hole 11. A compressive spring 12 is secured to the supporting bar 6 to bias the bimetal element 9 elastically toward the lower face of the contact terminal 6a. Three main heaters 13 are respectively made of such resistance material as nichrome wire or the like each of which is connected electrically between the terminal 4 and the fixed contact 5 so disposed to energize the main heaters 13 to heat the bimetal element 9 through space in the case 2. A heater 14 of positive temperature coefficient type (abbreviated as PTC heater hereinafter) consists of an thermistor-made auxiliary heater having such a coefficient as a characteristic curve A shown in FIG. 7 in which: R is value of resistance, T temperature and To temperature of Curie point. The PTC heater 14 is formed, for example disclike with both an upper and lower face having an electrode layer respectively to be interposed for contact between an upper face of the contact terminal 6a and elastically metallic terminal 16. Accordingly, a half portion of the electrode layers of the PTC heater 14 connects electrically to the bimetal element 9 through contact of the contact terminal 6a on the supporting bar 6. Said disc-shaped bimetal element 9, the traveling contact 10 and the fixed contact 5 combine to form a bimetallic switch 17. The bimetal element 9 remains with its traveling contact 10 against the fixed contact 5 as shown in FIG. 1, when the amount of heat the bimetal element 9 is subjected to is under a predetermined value. The bimetal element 9 snaps to separate the traveling contact 10 from the fixed contact 5 when the ambient temperature or the temperature of heat the bimetal element is subjected to from the main heater 13 or the PTC heater 14 exceeds a predetermined value.

Figure 8:
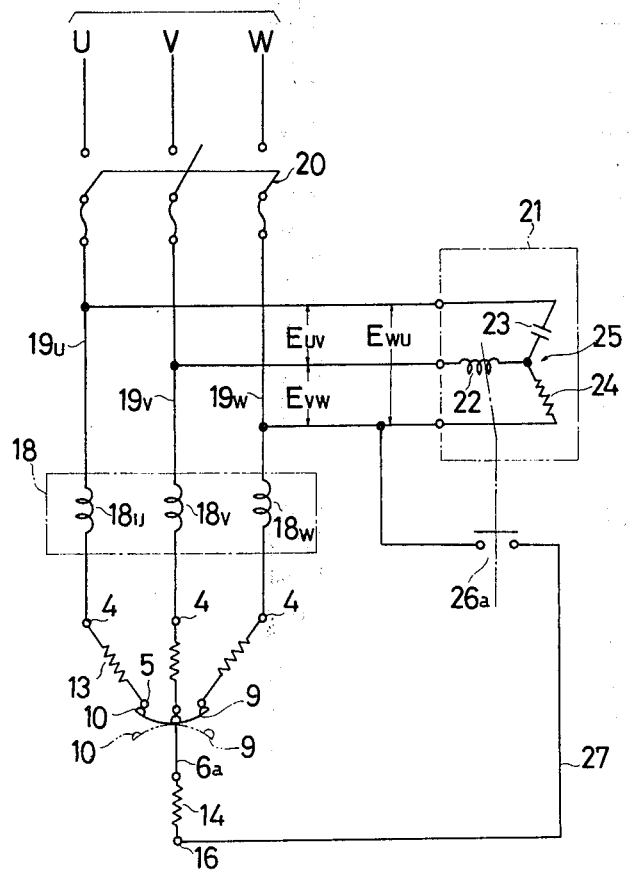
FIG. 8 is a schematic diagram of a protective circuit employing a thermal relay of the invention.

FIG. 8 illustrates an application of the thermal relay 1. Referring to FIG. 8, numeral 18 designates a three-phase induction motor, one terminal of each coil 18U, 18V, 18W is connected to a three-phase ac source (not shown) through wires 19U, 19V, 19W serving as power source line and a manual operated breaker 20. Each neutral terminal of each coil 18U, 18V, 18W is connected respectively to the connecting tongues 4a extending from the terminals 4 of the thermal relay 1.

Figure 9:
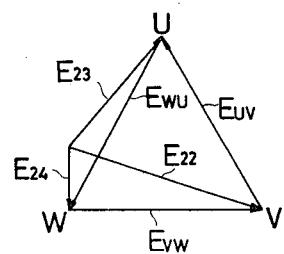
FIG. 9 and FIG. 10 are voltage vector diagrams for explanation of a negative phase sequence detective relay employed in the invention.
Figure 10:
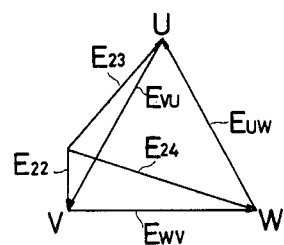

Accordingly, under the condition where the temperature is below the temperature the bimetal element 9 is to be actuated the traveling contact 10 is closed against the fixed contact 5. The neutral point of each motor coil 18U, 18V, 18W is commonly connected by the bimetal element 9 through the main heater 13 with the fixed contact 5 and the traveling contact 10 forming a Y-connection. Numeral 21 designates a negative phase sequence relay which is designed the same as that disclosed in Japanese utility model application No. 37-10925. That is to say, the relay 21 has a coil portion 22 serving as an inductive reactance, a condenser 23 as a capacity reactance and a resistance material 24 to form a Y-connection circuit 25, each terminal of which is connected to each of said wires 19U, 19V, 19W. Numeral 26a designates a detection output switch, comprising an electromagnetic relay together with coil portion 22, which is adapted to close when a density of flux established in said coil portion 22 reduces to below a predetermined value. With respect to the negative phase sequence detective relay 21, when the three-phase ac source is in a positive phase sequence, namely phase rotational direction being U, V, W in turn, the vector diagram is shown in FIG. 9 in which: Euv, Evw, Ewu are respectively across-line voltages, $E_{22}$, $E_{23}$, $E_{24}$ are phase voltages of the coil portion 22, of condenser 23 and of the resistance material 24 respectively. When the three-phase ac source is submitted to negative phase sequence for the phase rotational direction to be U, W, V, the vector diagram in FIG. 9 changes to that as shown in FIG. 10. For positive phase sequence of the three-phase ac source as shown in FIG. 9, the detection output switch 26a is maintained open for high magnitude of the phase voltage and high flux density established in the coil portion 22. On the contrary, for negative phase sequence, the phase voltage of the coil portion 22 decreases to that shown in FIG. 10. This results in reduction of the flux density and closes the detection output switch 26a. Said detection output switch 26a is interposed between the wire 19W and the terminal 16 of the thermal relay 1. For the arrangement mentioned above, both the terminal 4 and the fixed contact 5 function as a main terminal for the main heater 13, also both the supporting bar 6 and the terminal 16 function as an auxiliary terminal for the PTC heater 14 acting as an auxiliary heater.

In operation, referring to FIG. 8, closing the manual breaker 20 by means of manual operation causes the induction motor 18 to run. While running the motor 18, when overcurrent caused from overloaded operation flows through the motor coil 18U, 18V, 18W, or when open-phase is set up in the three-phase ac source, said overcurrent is permitted to flow through the main heater 13 of the thermal relay 1 to make the heater 13 hot. This results in the bimetal element 9 to curve in the opposite direction to that shown in FIG. 1 to that as shown in FIG. 8 by the phantom line position and separate the traveling contact 10 from the fixed contact 5 for de-energizing the motor coils 18U, 18V, 18W.

If a negative phase sequence of the three-phase ac source occurs, the negative sequence detective relay 21 detects it and closes the detection output switch 26a in the same manner aforementioned. This also closes auxiliary heater circuit 27 to energize the PTC heater 14 for voltage developed across the wire 19W to the bimetal element 9 connected to neutral point of the motor 18. The PTC heater 14 made hot by energization actuates the bimetal element 9 to snap it to that shown in FIG. 8 by the phantom line position for separation of the traveling contact 10 from the fixed contact 5 to de-energize the motor 18.

As being obvious from the explanation aforementioned, the thermal relay 1 of the present invention protects "an electrical device objective for protection" against the overcurrent or a rise of the ambient temperature, and at the same time will de-energize the device even upon external instruction for a wider application. An application of the thermal relay 1 to a driving motor of an underwater pump or on air conditioning equipment, on the one hand, operates to protect the motor against its overloaded running, etc. and on the other, to stop the motor in response to such external informations as reduced water level or shortage of refrigerant.

According to the embodiment, the PTC heater mounted on the thermal relay 1 is maintained at a temperature of around the Curie point.

Figure 11:
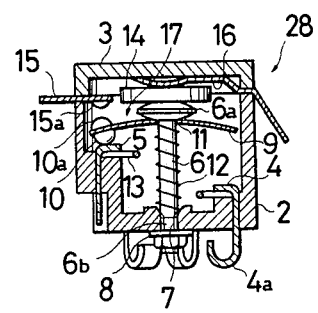
FIG. 11 is a cross sectional view of a thermal relay in another embodiment of this invention.
Figure 12:
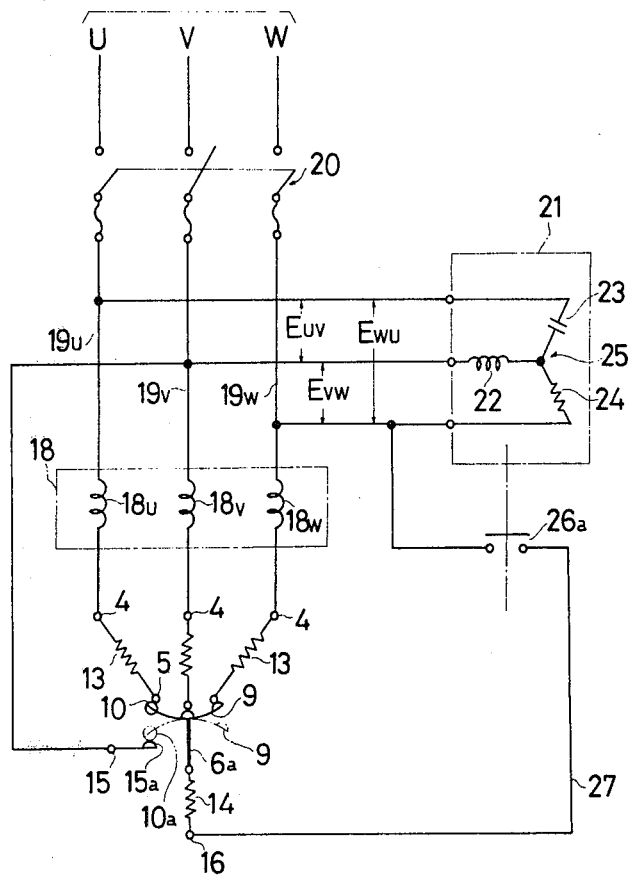
FIG. 12 is a schematic diagram of a protective circuit in the embodiment of FIG. 11.

Another embodiment of the present invention is shown in FIG. 11 and FIG. 12. With respect to the thermal relay 28 of this embodiment, a travel contact 10a is additionally secured to the bimetal element 9 of the bimetallic switch 17 together with the three traveling contacts 10. A second fixed contact 15a is anchored on a terminal 15 extending into the case 2 in registry with a traveling contact 10a. The bimetallic switch 17 is so arranged as to make the traveling contact 10a travel between the fixed contact 5 and the second fixed contact 15a to form a transfer type switch. Any other arrangements of the thermal relay 28 than those specifically described above are identical to those in the embodiment shown in FIG. 1. An application of the thermal relay 28 is, by way of illustration, shown in FIG. 12 in which: the first terminal 15 is connected to the wire 19V, other arrangements than those are identical to those shown in FIG. 8. According to the arrangement shown in FIG. 12, when the negative phase sequence relay 21 detects negative phase sequence of ac power source, the detection output switch 26a is so closed for the PTC heater 14 as to energize for heat generation, then the bimetal element 9 is snapped to the phantom line position as shown in FIG. 12. As a result, the traveling contact 10a of the bimetallic switch 17 closes against the second fixed contact 15a and voltage across the wire 19V to 19W is applied to the PTC heater 14. This switches the bimetal element 9. The supply of power source to the motor 18 is shut off until the manual breaker 20 is operated again.

Figure 13:
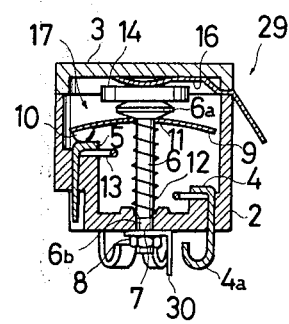
FIG. 13 is a lateral cross sectional view of a thermal relay of still another embodiment.
Figure 14:
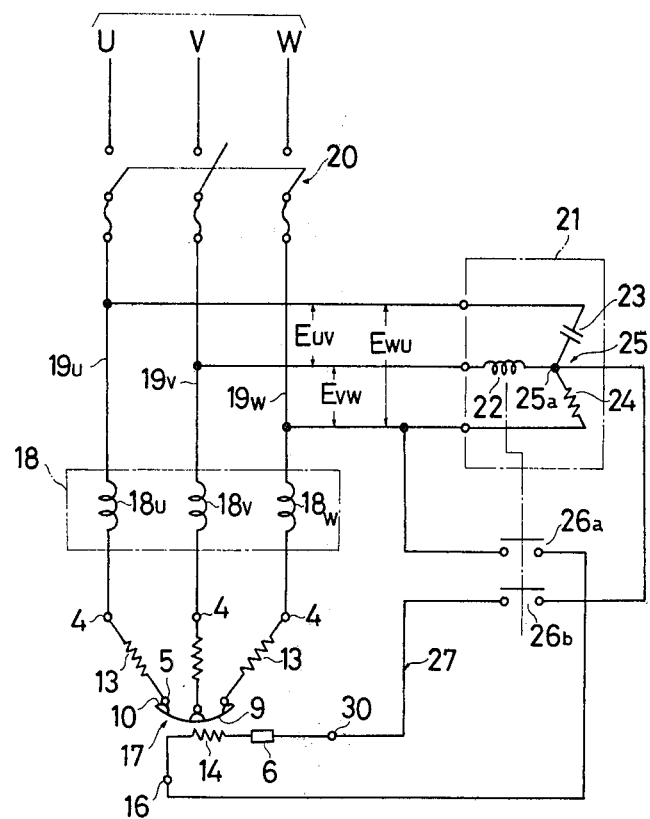
FIG. 14 is a schematic diagram of a protective circuit of said embodiment of FIG. 13.

A thermal relay 29 according to another embodiment of the present invention is illustrated in FIG. 13 in which: an auxiliary terminal 30 is so disposed to a bottom wall outside the case 2 as to be fixed to a lower end of the supporting bar 6 for electrical contact secured against removal by the nut 8. Any other arrangements than those specifically described above are identical to those as shown in FIG. 1. An example of an application of the thermal relay 29 is illustrated in FIG. 14 in which: the auxiliary terminal 30 is electrically connected to a neutral point 25a in the Y-connection circuit 25 of the negative phase sequence relay 21 through the detection output switch 26b. All other arrangements than those are identical to those as shown in FIG. 12.

According to the application as shown in FIG. 14, when the negative sequence detective relay 21 detects negative phase sequence to close the detection output switch 26a, 26b, the PTC heater is so energized by voltage developed across the neutral point 25a in the Y-connected circuit to the wire 19W as to cause the bimetallic switch 17 to snap and will remain in that position until the manual breaker 20 is operated again.

Pursuant to the embodiment shown in FIG. 8, though the bimetallic switch 17 switched by either the main heater 13 or the PTC heater 14 repeats the switching periodically, the opening of the manual breaker 20 serves to protect the motor 18. The same can be also applied to the arrangement according to the schematic diagrams shown in FIG. 12 and FIG. 14 for the bimetallic switch 17 to be switched by the main heater 13. Still further according to the present invention, the arrangement that the bimetal element 9 is supported by the supporting bar 6 and the PTC heater 14 being interposed between the upper end of the bar 6 and elastic terminal 16, allows the thermal relay to be made with a restricted number of parts. This is advantageous especially when a thermal relay is so housed within a motor for its application as to be responsive to a rise of the ambient temperature.

Accordingly, the thermal relay of the present invention makes it possible both to protect electrical devices against an overcurrent, generated heat and to shut off the supply of power source by external instruction.

What is claimed is:

1. In a three phase ac electric motor system comprising a three phase electric motor and a manual switch to control flow of current to said motor, the improvement of a protective device to protect said system against both motor overload and negative phase sequence, said protective device comprising:
    a snap-action bimetallic switch of the normally closed circuit type connected in series with said motor,
    a casing enclosing said bimetallic switch,
    a main heater disposed in said casing adjacent said bimetallic switch, said heater being connected in series with said motor and said bimetallic switch so that when said bimetallic switch is heated above a predetermined temperature by an overload current through said motor said bimetallic switch will snap into an open circuit mode,
    a PTC heater disposed in said casing adjacent to said bimetallic switch so that when said bimetallic switch is heated above said predetermined temperature by said PTC heater said bimetallic switch will snap into an open circuit mode,
    a negative phase sequence detector electrically connected to said motor, said detector having an output switch of the normally open circuit type that is closed when said detector senses a negative phase sequence in said motor system,
    said PTC heater being connected in series with said output switch to be energized to heat to above said predetermied temperature upon closing of said output switch and
    circuit means to cause said PTC heater to continue to heat once said output switch closes as long as said abnormal condition continues comprising an auxiliary contact on said bimetallic switch that engages a fixed contact within said casing when said bimetallic switch snaps into said open circuit mode, said contacts being electrically connected in series with said PTC heater, and the power supply line of one of the three field windings of said three phase motor and said output switch is connected in series with said PTC heater and the power supply line of another of said three field windings of said three phase motor.

2. The electric motor system of claim 1 wherein said circuit means includes a Y-connection circuit in said detector, said PTC heater is connected in series at one end through said output switch to the power supply line of one of the three field windings of said three phase motor and in series at the other end through said output switch to said Y-connection circuit.

* * * * *